(12) United States Patent
Putter

(10) Patent No.: US 11,076,541 B2
(45) Date of Patent: Aug. 3, 2021

(54) SELF-WATERING PLANTER WITH UNIQUE WICKING DEVICES AND SOIL DRAINAGE FILTRATION ASSEMBLY

(71) Applicant: Equinox Industries Ltd, Winnipeg (CA)

(72) Inventor: Jonathan Putter, Winnipeg (CA)

(73) Assignee: Equinox Industries Ltd., Winnipeg (CA)

( * ) Notice: Subject to any disclaimer, the term of this patent is extended or adjusted under 35 U.S.C. 154(b) by 520 days.

(21) Appl. No.: 16/018,873

(22) Filed: Jun. 26, 2018

(65) Prior Publication Data

US 2019/0124860 A1 May 2, 2019

(30) Foreign Application Priority Data

Jul. 25, 2017 (CA) .............................. CA 2974420

(51) Int. Cl.
*A01G 27/06* (2006.01)
*A01G 9/02* (2018.01)

(52) U.S. Cl.
CPC ............... *A01G 27/06* (2013.01); *A01G 9/02* (2013.01)

(58) Field of Classification Search
CPC .......... A01G 9/02; A01G 9/021; A01G 9/028; A01G 27/00; A01G 27/02; A01G 27/04; A01G 27/06
USPC ....................................................... 47/79–82
See application file for complete search history.

(56) References Cited

U.S. PATENT DOCUMENTS

| | | | | | |
|---|---|---|---|---|---|
| 2,865,137 A | * | 12/1958 | Longacre | ............... | A01G 27/04 47/80 |
| 3,220,144 A | * | 11/1965 | Green | ..................... | A01G 27/06 47/80 |
| 4,231,187 A | * | 11/1980 | Greenbaum | ........... | A01G 27/04 47/39 |
| 4,397,114 A | * | 8/1983 | Skaife | .................... | B65D 85/52 47/81 |
| 4,829,709 A | * | 5/1989 | Centafanti | ............. | A01G 27/04 47/79 |

(Continued)

FOREIGN PATENT DOCUMENTS

| | | | | | |
|---|---|---|---|---|---|
| DE | | 2610613 A1 | * | 9/1977 | ............. A01G 27/04 |
| JP | | 06141683 A | * | 5/1994 | ............. A01G 27/06 |

*Primary Examiner* — Peter M Poon
*Assistant Examiner* — Danielle A Clerkley
(74) *Attorney, Agent, or Firm* — Kyle R. Satterthwaite; Michael R. William; ADE & Company Inc.

(57) ABSTRACT

A self-watering planter features wicking devices whose outer tubes feature a skeletal upper structure having a plurality of columns periodically interconnected by rings spanning circumferentially around the wicking material to delimit windows of large area for optimum water seepage to the soil. A flange at the bottom of the tube's skeletal upper portion cooperates with snap features at the top of a lower portion that hangs in the water reservoir to provide snap-fit installation of the wicking devices on a divider wall of a permanently enclosed planter. A soil drainage filtration device features filtration fabric held in a sandwiched state around a drainage opening in the divider wall by one or more mounting plates. In one embodiment, the fabric forms a sack that hangs into the reservoir to suspend a volume of soil therein, whereby the suspended soil serves as wicking agent in the absence of excess rainwater needing drainage.

10 Claims, 5 Drawing Sheets

(56) References Cited

U.S. PATENT DOCUMENTS

| | | | | |
|---|---|---|---|---|
| 4,991,346 A * | 2/1991 | Costa, Jr. | ................ | A01G 27/04 47/79 |
| 5,193,306 A * | 3/1993 | Whisenant | ............. | A01G 27/04 47/65.8 |
| 5,644,868 A * | 7/1997 | Lui | ........................ | A01G 27/06 47/79 |
| 6,079,156 A * | 6/2000 | Colovic | ................ | A01G 27/04 47/81 |
| 6,226,921 B1 * | 5/2001 | Kang | ..................... | A01G 27/06 47/81 |
| 7,171,783 B1 * | 2/2007 | Fidotti | ................... | A01G 27/04 47/81 |
| 2003/0062282 A1 * | 4/2003 | Bianchi | ................... | A01G 9/02 206/423 |
| 2004/0237403 A1 * | 12/2004 | Sekiya | .................. | A01G 27/06 47/81 |
| 2011/0036006 A1 * | 2/2011 | Griebel | ................. | A01G 27/06 47/81 |
| 2014/0007501 A1 * | 1/2014 | Griebel | ............... | A01G 27/003 47/48.5 |
| 2017/0020093 A1 * | 1/2017 | Jeon | ....................... | A01G 27/04 |

\* cited by examiner

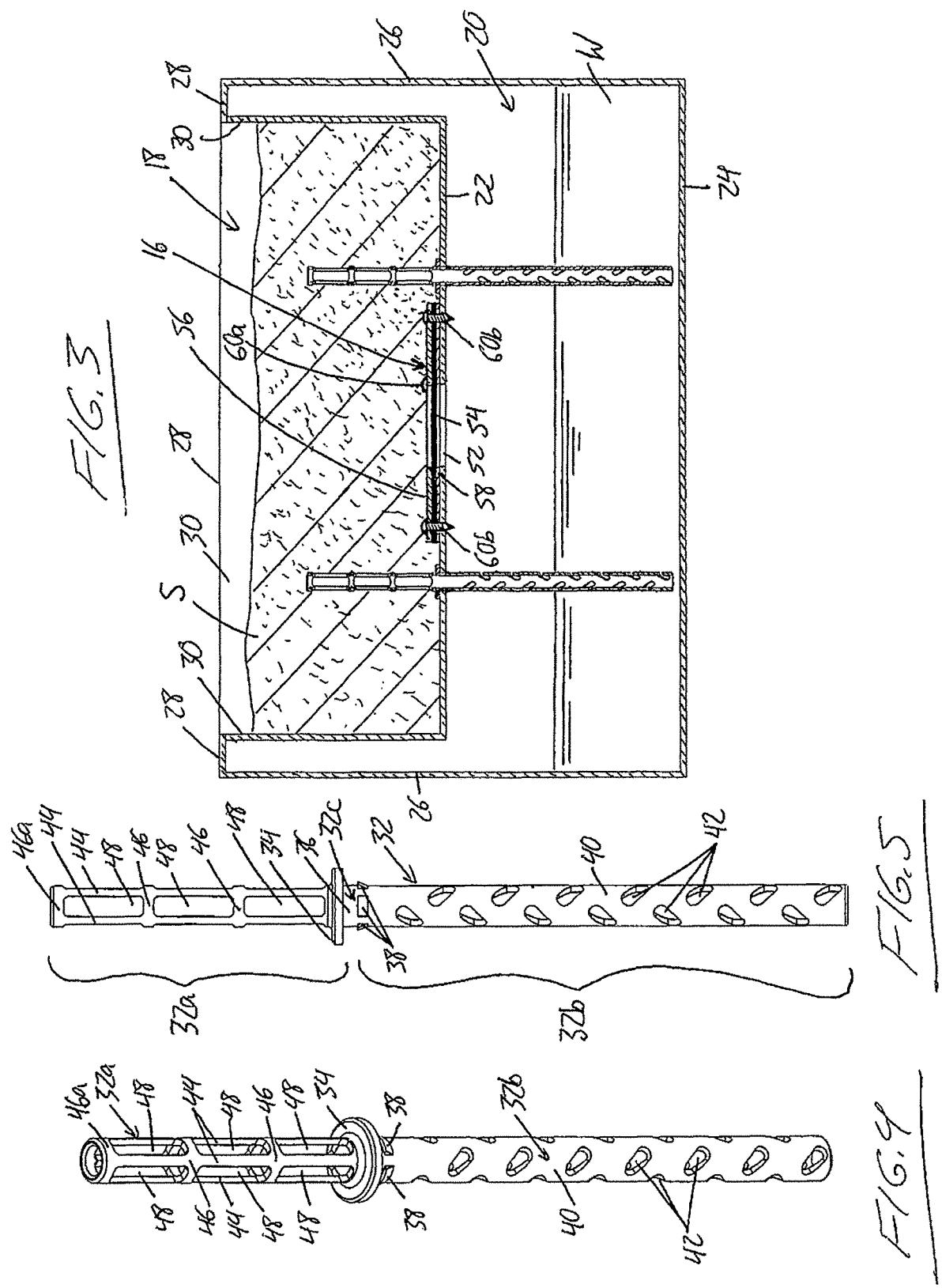

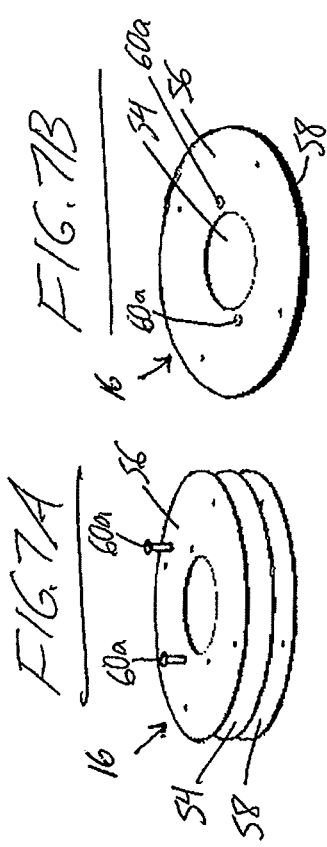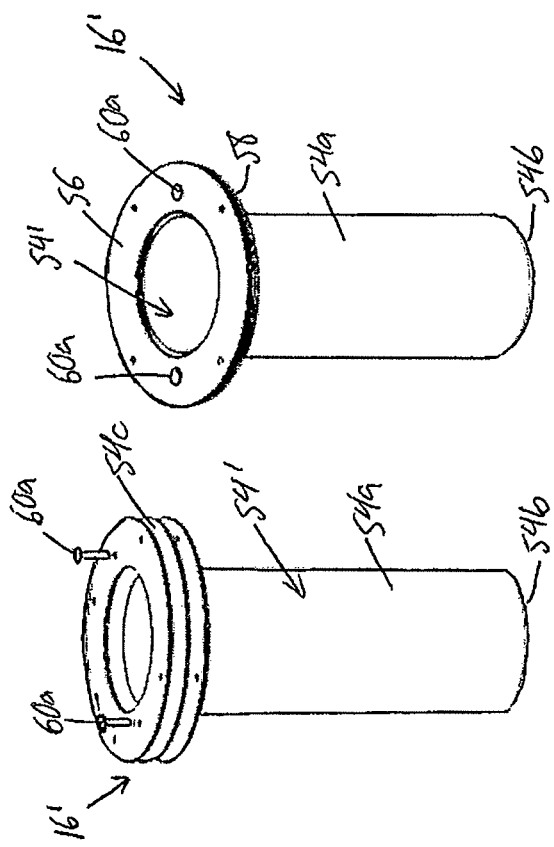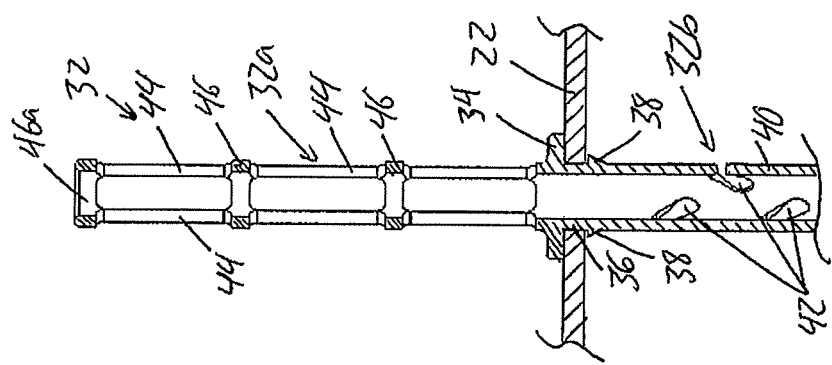

SELF-WATERING PLANTER WITH UNIQUE WICKING DEVICES AND SOIL DRAINAGE FILTRATION ASSEMBLY

CROSS-REFERENCE TO RELATED APPLICATIONS

This application claims benefit under 35 U.S.C. 119(a) of Canadian Application No. 2,974,420, filed Jul. 25, 2017, the entirety of which is incorporated herein by reference.

FIELD OF THE INVENTION

The present invention relates to self-watering planters that feature a soil chamber situated over a water reservoir from which water is wicked into the soil for self-administered watering of the plants therein.

BACKGROUND

Self-watering planters of the general type referenced above are well known in the prior art. Examples of such planters can be found in U.S. Pat. Nos. 1,977,827, 2,072,185, 4,829,709, 4,903,432, 4,916,858, 5,081,790, 5,136,806, 5,622,004, 5,644,868, 6,038,814, 6,226,921, 6,370,819, 9,392,756 and 9,439,370; U.S. Patent Application Publications US2015/0033625 and US2016/005086; and UK Patent Application GB238297.

However, there remains room for improvements and alternatives to these prior designs, and applicant has developed a novel planter with unique features not seen in the forgoing prior art.

SUMMARY OF THE INVENTION

According to a first aspect of the invention, there is provided a self-watering planter apparatus comprising:

a planter having an upper soil chamber for holding a volume of soil to enable growth of one or more plants in said upper soil chamber, and a lower water reservoir disposed beneath said upper soil chamber to contain water for self-administered watering of said one or more plants;

a divider wall that separates said upper soil chamber and said lower water reservoir, defines a floor of said soil chamber and has a plurality of holes therein by which the upper soil chamber is communicated with said lower water reservoir; and a plurality of water wicking devices each comprising an axially elongated outer tube and wicking material contained within said outer tube and reaching axially therealong, each outer tube being received or receivable in a respective one of the plurality of holes in the divider wall in an installed position reaching from the lower water reservoir into the upper soil chamber, the outer tube having openings therein at both a lower portion of the tube that resides in the lower water reservoir in the installed position and at an upper portion that resides in the upper soil chamber in the installed position, whereby water from the lower soil reservoir is wicked up into the upper soil chamber by the wicking material of each wicking device;

wherein the upper portion of the outer tube of each water wicking device comprises a skeletal structure having a plurality of columns disposed at circumferentially spaced positions around the wicking material, a plurality of rings spanning circumferentially around the wicking material to interconnect the columns at discrete positions therealong, and window spaces delimited between the columns and the rings to define the openings of the upper portion of the outer tube.

Preferably the openings in the lower portion of the outer tube of each wicking device are smaller than the window spaces in the upper portion thereof.

Preferably the lower portion of the outer tube of each wicking device comprises a perforated circumferential wall of cylindrical shape.

Preferably the window spaces of the upper portion of the outer tube of each wicking device collectively span a greater fraction of a circumferential measure of the outer tube than the columns.

Preferably the window spaces of the upper portion of the outer tube of each wicking device span a greater fraction of a peripheral area of the outer tube than the columns.

Preferably there is a support flange projecting outward from the outer tube of each wicking device at a lower end of the upper portion thereof for seating atop the divider wall of the planter to support the wicking device in the installed position.

Preferably there is a snap fit arrangement defined at an exterior of the outer tube of each wicking device at an upper end of the lower portion thereof to catch under the divider wall of the planter in the installed position to resist upward withdrawal of the wicking device from the installed position.

Preferably the snap fit arrangement comprises a plurality of catch tabs of lesser radial reach from the outer tube than the support flange and disposed at circumferentially spaced positions around the outer tube.

Preferably the planter is a double-walled planter of single-piece construction integrally defining the upper soil chamber, the lower water reservoir, and the divider wall.

Preferably an axial length of the lower portion of the outer tube of each wicking device is shorter than a height of the lower water reservoir, whereby each wicking device hangs from the divider wall in the installed position with a bottom end of the wicking device suspended above a bottom wall of the lower water reservoir.

According to a second aspect of the invention, there is provided a self-watering planter apparatus comprising:

a planter having an upper soil chamber for holding a volume of soil to enable growth of one or more plants in said upper soil chamber, and a lower water reservoir disposed beneath said upper soil chamber to contain water for self-administered watering of said one or more plants;

a divider wall that separates said upper soil chamber and said lower water reservoir, defines a floor of said soil chamber and has a plurality of holes therein by which the upper soil chamber is communicated with said lower water reservoir; and a plurality of water wicking devices each comprising an axially elongated outer tube and wicking material contained within said outer tube and reaching axially therealong, each outer tube being received or receivable in a respective one of the plurality of holes in the divider wall in an installed position reaching from the lower water reservoir into the upper soil chamber, the outer tube having openings therein at both a lower portion of the tube that resides in the lower water reservoir in the installed position and at an upper portion that resides in the upper soil chamber in the installed position, whereby water from the lower soil reservoir is wicked up into the upper soil chamber by the wicking material of each wicking device;

wherein each wicking device comprises a support flange projecting outward from the outer tube at a lower end of the upper portion thereof for seating atop the divider wall of the planter to support the wicking device in the installed position, and a snap fit arrangement defined at an exterior of the outer tube of each wicking device at an upper end of the lower portion thereof to catch under the divider wall of the planter in the installed position to resist upward withdrawal of the wicking device from the installed position.

According to a third aspect of the invention, there is provided a self-watering planter apparatus comprising:

a planter having an upper soil chamber for holding a volume of soil to enable growth of one or more plants in said upper soil chamber, and a lower water reservoir disposed beneath said upper soil chamber to contain water for self-administered watering of said one or more plants;

a divider wall that separates said upper soil chamber and said lower water reservoir, defines a floor of said soil chamber; and a plurality of water wicking devices reaching, or arranged for reaching, from the lower water reservoir into the upper soil chamber to wick water from the lower soil reservoir up into the upper soil chamber for self-administered watering of the one or more plants;

a drainage opening in the divider wall through which excess water from the soil can drain into the lower water reservoir; and a filtration assembly at said drainage opening to allow said excess water to drain into the lower water reservoir while preventing soil from falling thereinto, said filtration assembly comprising a piece of soil filtration fabric, areas of which are held in a sandwiched state at an area surrounding the opening in the divider wall by at least one mounting plate fitted over said area of the divider wall.

Preferably said at least one mounting plate is fastened through said divider wall.

Preferably said at least one mounting plate is fastened through said divider wall by rivets.

Preferably said at least one mounting plate comprises two mounting plates between which the soil filtration fabric is sandwiched.

In one embodiment, said soil filtration fabric comprises a generally flat sheet of said fabric laid overtop of the opening in the divider wall.

In another embodiment, said soil filtration fabric forms a sack hanging downwardly through the opening in the divider wall.

According to a fourth aspect of the invention, there is provided a self-watering planter apparatus comprising:

a planter having an upper soil chamber for holding a volume of soil to enable growth of one or more plants in said upper soil chamber, and a lower water reservoir disposed beneath said upper soil chamber to contain water for self-administered watering of said one or more plants;

a divider wall that separates said upper soil chamber and said lower water reservoir, defines a floor of said soil chamber; and an opening in the divider wall; and a sack made of soil filtration fabric allowing water to pass therethrough and preventing passage of soil therethrough, said sack hanging downwardly into the water reservoir from the opening in the divider wall.

Preferably the sack comprises a rim radiating outwardly from a top end of the sack, said rim being sandwiched in place over the divider wall by at least one mounting plate fitted over the divider wall around the opening therein.

Preferably said at least one mounting plate comprises two mounting plates between which the rim of the sack is sandwiched.

Preferably said sack contains a wicking agent therein enabling wicking of water into the upper soil chamber from the lower water reservoir.

Preferably the wicking agent is a volume of soil.

Preferably the sack has an open upper end at which an interior of the sack communicates with the upper soil chamber.

BRIEF DESCRIPTION OF THE DRAWINGS

Preferred embodiments of the invention will now be described in conjunction with the accompanying drawings in which:

FIG. 3 is a cross-sectional view of the apparatus of FIG. 2 as would be seen along a vertical mid-plane denoted by line A-A thereof once filled with soil and water.

FIG. 4 is an isolated perspective view of one wicking device from the planter of FIG. 1.

FIG. 5 is an elevational view of the wicking device of FIG. 4.

FIG. 6 is a partial closeup of the cross-sectional view of FIG. 3 illustrating mounting of the wicking device to a divider wall that separates a soil chamber of the planter from a water reservoir thereof.

FIG. 7A is an exploded perspective view of a soil drainage filtration assembly of the planter of FIG. 1.

FIG. 7B is an assembled perspective view of the soil drainage filtration assembly of FIG. 7A.

FIG. 8A is an exploded perspective view of an alternate embodiment soil drainage filtration assembly of the planter of FIG. 1.

FIG. 8B is an assembled perspective view of the soil drainage filtration assembly of FIG. 8A.

DETAILED DESCRIPTION

Figure 1:
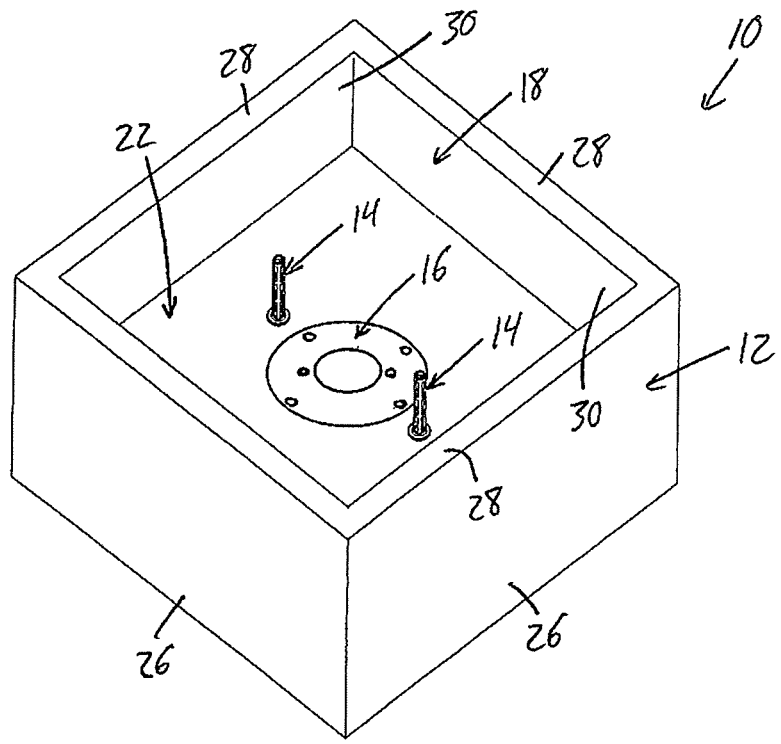
FIG. 1 is a perspective top view of a self-watering planter apparatus according to a first embodiment of the present invention.
Figure 2:
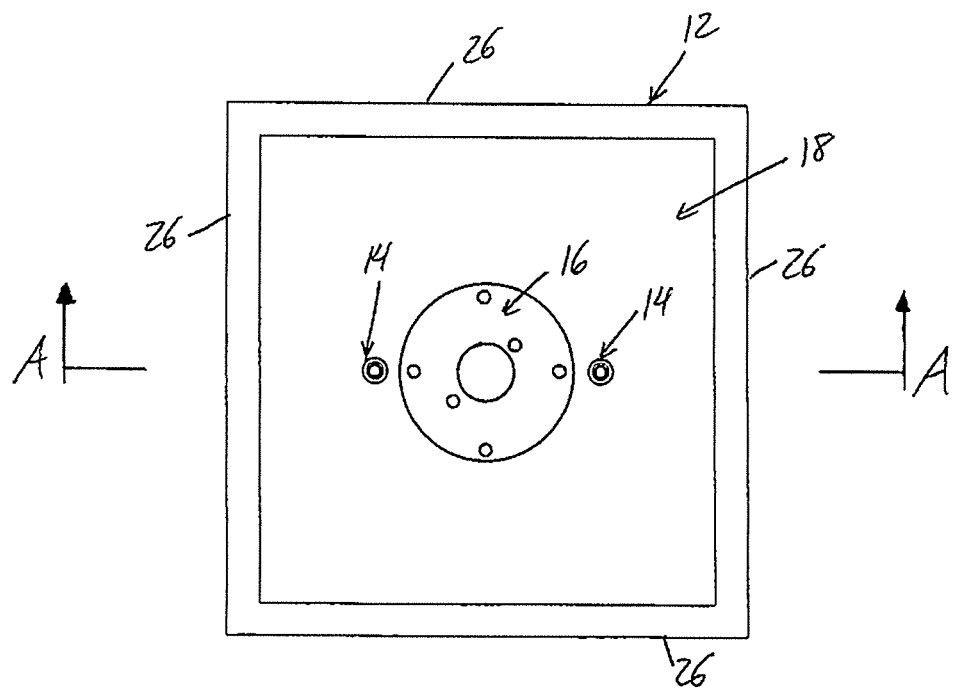
FIG. 2 is an overhead plan view of the apparatus of FIG. 1.

FIG. 1 shows a first embodiment of the present invention in the form of a self-watering planter apparatus 10 whose main components are a planter 12, a plurality of wicking devices 14, and a soil drainage filtration assembly 16. The planter 12 of the illustrated embodiment is a single-piece, double-walled, rotationally molded planter 12 that integrally defines both an open-topped upper soil chamber 18, and an enclosed lower water reservoir 20 situated therebeneath.

A horizontal divider wall 22 defines the floor of the upper soil chamber 18 and a ceiling of the lower water reservoir, thus horizontally separating the lower water reservoir from the upper soil chamber 18. A bottom wall 24 of the lower water reservoir defines the floor of the lower water reservoir and the base of the overall planter. Around the perimeter of this bottom wall 24, outer walls 26 stand vertically upright therefrom to define the outermost periphery of the planter and the containment walls of the water reservoir that hold a volume of water W therein atop the bottom wall 24. In-turned top edge walls 28 just a short distance inwardly from the outer walls 26 at the top ends thereof, and the space delimited between the top edge walls 28 defines the open top of upper the soil chamber 18. A set of inner walls 30 reach vertically downwardly from the top edge walls 28 to the floor of the soil chamber 18 in order to suspend the divider wall 22 between these inner walls 30.

In this above described double wall structure, the inner and outer upright walls 30, 26 are paired in opposition with one another to define outer boundaries of the soil chamber 18 and the underlying water reservoir 20, and horizontal walls 22, 24 are paired in opposition with one another to define the bottom boundaries of the soil chamber 18 and the underlying water reservoir 20. This results in a single-piece planter construction defining both the soil chamber and the water reservoir as integral parts of a singular unitary structure. However, it will be appreciated from the following description that the unique wicking devices and soil drainage filtration assembly of the present invention may also be used in self-watering planters where the water reservoir and soil chamber are defined by separate but cooperating units, for example a water reservoir unit and a separate potting unit supported thereon to provide a soil chamber in overhead relation to the water stored within the reservoir. In the case of either a single-piece or multi-piece planter construction, the soil chamber is provided with a volume of soil S or other plant growth media in which plants are seeded or planted for propagation therein over time.

In a known manner, each wicking device 14 features an axially elongated outer tube 32 that passes through a respective hole in the divider wall 22. Each tube 32 has a hollow interior space that spans the full axially length of the tube and is filled with a wicking material (not shown), and has openings that communicate the hollow interior of the tube with the exterior thereof at both an upper portion 32a of the tube that resides in the upper soil chamber and a lower portion 32b of the tube that resides in the lower water reservoir. This way, the wicking material absorbs water W from the reservoir through the openings in the lower portion of the tube and wicks the water up into the soil chamber through capillary action, where the openings in the upper portion of the tube allow the water to seep into the surrounding soil S. However, the outer tube 32 of the presently disclosed wicking device has a novel design with unique features for improving the water delivery function to the soil, and for providing a unique attachment of the tube 32 to the planter.

A support flange 34 projects radially outward from the outer tube 32 around the full circumference thereof, and sits atop the floor of the upper soil chamber 18 at the topside of the divider wall 22 in the wicking device's installed position on the planter. The location of the flange 34 thus denotes the lower end of the upper portion of the tube 32. A fully intact cylindrical wall section 36 of the tube reaches downwardly from the underside of the flange 34, and at a short axial distance below the flange, carries a plurality of snap fit catch tabs 38 that project radially outward from the outer surface of the intact cylindrical wall section 36 at spaced apart positions therearound. The illustrated embodiment features four catch tabs 38 separated from one another by untabbed areas of the intact cylindrical wall that are of lesser angular span around the tube than the tabs themselves, but the quantity of catch tabs and the angular spacing thereof around the circumference of the tube may be varied. Each catch tab 38 has a triangular or wedge-like shape that tapers downwardly in terms of the tabs radial extent from the intact cylindrical wall of the tube. The wider top end of each catch tab thus defines a shoulder jutting outwardly from the cylindrical wall of the tube in a radial plane lying normal to the central longitudinal axis L of the tube.

In the installed position of the wicking device, the intact cylindrical wall section 36 of the tube between the support flange 34 and the catch tabs 38 defines an intermediate portion 32c of the tube 32 that resides between the upper and lower portions 32a, 32b thereof, and thus occupies the respective hole in the divider wall 22 of the planter. The axial length of this intermediate portion 32c of the tube 32 is equal to or only slightly greater than the thickness of the divider wall 22, whereby the shoulders of the catch tabs 38 abut against or reside closely adjacent to the underside of the divider wall 22 around the respective hole therein so that the shoulders of the catch tabs block upward withdrawal of the tube 32 from its installed position.

With the support flange 34 seated atop the divider wall 22 to likewise help retain the tube in its installed position by blocking sliding of the tube downwardly through the hole in the divider wall 24, the lower portion 32b of the tube 32 hangs downwardly from the divider wall 22 into the lower water reservoir 20 of the planter. The location of the catch tabs 38 thus denotes the upper end of the tube's lower portion 32b. In the illustrated embodiment, the bottom end of the tube 32 is spaced a short distance above the bottom wall 24 of the planter, whereby the tube 32 is supported entirely by the divider wall 22 in a suspended state hanging therefrom. The tube's hollow interior spans the full axial length of the tube so that the bottom end of the tube is open, whereby this suspended position of the open bottom end of the tube above the bottom wall 24 of the planter enables the water W to be absorbed by the wicking material through the open bottom end of the tube.

The lower portion 32b of the tube 32 below the catch tabs 38 features an integral and continuous extension of the cylindrical section 36 found at the tube's intermediate portion 32c between the support flange 34 and the catch tabs 38, except that at the lower portion 32b, the cylindrical circumferential wall is not fully intact, and instead is a perforated cylindrical circumferential wall 40 with intact areas that are interrupted by an array of apertures 42 spaced circumferentially around and axially along the tube 32. These apertures 42 in the perforated circumferential wall 40, in additional to the optionally open bottom end of the tube, define the water-admitting openings of the tube's lower portion 32b.

The upper portion 32a of the tube 32 situated above the support flange does not employ a perforated cylindrical structure like the lower portion 32b, and instead has a skeletal structure composed of axially oriented columns 44 spaced circumferentially around the wicking material at regular intervals, and circumferentially spanning rings 46 disposed at regularly spaced intervals along the longitudinal axis L to brace and interconnect the columns and retain the wicking material within the interior space of the tube. An uppermost one of the rings 46a resides at the top end of the tube and delimits an open top end of the tube's hollow interior. The illustrated embodiment features two other rings situated between the uppermost ring 46a and the support flange 34 at equal axial distances therefrom, but the total number of rings and the axial spacing thereof may be varied. Likewise, while the illustrated embodiment features four columns distributed evenly around the longitudinal axis L at ninety degree intervals, the quantity of columns may be varied.

An array of open window spaces 48 in the upper portion 32a of the tube are delimited by the skeletal structure thereof. More specifically, each window space is bound on two sides thereof by a respective pair of the columns 44, and bound at the top and bottom of the window space by either two of the rings 46, or one of the rings 46 and the support flange 34. Each window space 48 is elongated in the axial direction tube, as the axial length measured between any two rings 46, or between the support flange 34 and the lowermost ring, is several times greater than the axially measured width of each ring 46. and also exceeds the circumferential distance measured around the longitudinal axis L between two neighbouring columns 44. Likewise, each window space 48 is least twice as wide as each column 44 in the circumferential direction of the tube 32. Therefore, the open window spaces 48 occupy a substantially majority of both the circumferential and axial measures of the tube's upper portion 32a, thus occupying a substantial majority of the overall peripheral area of the tube's upper portion 32a. Accordingly, this minimalist skeletal structure gives the upper portion 32a of the tube a very open design by which nearly all of the wicking material in this upper portion of the tube possesses direct exposure to the surrounding soil S in the upper soil chamber 18 of the planter to optimize the water transfer from the wicking material to the soil.

The illustrated planter is a roto-molded unit, where the water reservoir is permanently enclosed from the time of manufacture by the integrally molded connections between the outer walls 26 and the bottom wall 24, and so the wicking devices 14 cannot be installed from below the upper soil chamber 18. Accordingly the separately manufactured tubes 32 of the wicking devices 14 cannot be installed from inside the water reservoir 20, unlike some of the two-piece self-watering planters of the prior art.

The arrangement of the support flange 34 at the lower end of the tube's upper portion 32a and the catch tabs 38 at the upper end of the tube's lower portion 32b enables snap-fit insertion of the wicking device 14 into the installed position from above from the divider wall 22. The bottom end of the tube 32 is lowered down through the respective hole in the divider wall 22 into the lower water reservoir 20. When the downwardly tapered snap fit catch tabs 38 reach the hole in the divider wall 22, they resist further downward travel of the tube 32 due to dimensional interference between the tabs and the hole in the divider wall. The tube 32 is pushed downward with sufficient force to overcome this resistance so that the tabs 38 momentarily deflect inwardly toward the tube's central longitudinal axis L, whereupon the deflected tabs 38 clear the divider wall 22 and pass fully through the hole therein. As soon as the tabs 38 clear the divider wall 22, the support flange 34 comes into contact with the divider wall 22 at the floor of the upper soil chamber 18 in order to prevent further downward travel of the tube. At this point, the catch tabs 38 resiliently pop back out from their inwardly deflected state so that the shoulders of the tabs 38 catch under the divider wall 22 around the hole therein in order to prevent upward withdrawal of the tube 32 from this installed condition.

In addition to the unique skeletal structure and mounting details of the wicking device tubes, the planter apparatus disclosed herein also features a unique soil drainage filtration assembly 16 that allows excess water to drain from the upper soil chamber 18 down into the lower water reservoir 20 while preventing the soil S from falling freely into the water.

A drainage opening 52 is provided in the divider wall to enable this transfer of excess water from the soil chamber 18 down into the water reservoir 20. In the embedment shown in FIGS. 1 to 7, a piece of soil filtration fabric 54 overlies the drainage opening 52 at the topside of the divider wall 22 in a sandwiched position between matching upper and lower mounting plates 56, 58 that respectively reside over and under said fabric 54. Each mounting plate 56, 58 has an annular form with a central hole therein for alignment with the central hole of the other mounting plate and the drainage opening 52 in the divider wall 22. The fabric 54 sandwiched between the mounting plates spans across the central holes of the two mounting plates 56, 58, which are attached together through the fabric 54 by suitable fasteners, for example by pop rivets 60a, so that the plates firmly hold the fabric 54 therebetween. In turn, the mounting plates 56, 58 are fastened to the divider wall 22 by additional fasteners, for example by screws 60b.

With outer areas of the fabric firmly sandwiched between the fastened-together mounting plates, the central area of fabric 54 spanning the central holes of the mounting plates is held taut over the aligned drainage hole 52 of the planter's divider wall 22 so as not to sag therethrough under the weight of the soil in the upper soil chamber. The soil filtration fabric 54 allows water, but not soil, to pass therethrough, down into the water reservoir through the central holes of the mounting plates and the drainage opening of the planter's divider wall. The illustrated embodiment uses two mounting plates 56, 58 between which the fabric 54 is sandwiched so that the filtration unit is pre-assembled separately of the planter in the manner shown in FIG. 7A, where the two mounting plates 56, 58 are fastened together from opposite sides of a sheet of fabric 54 that is being held in a taut condition between the plates. However, other embodiments may instead sandwich the fabric directly between the divider wall 22 of the planter and a singular upper mounting plate 56 placed over the fabric.

The unique fabric-based drainage filter assembly is believe to provide better prevention of soil loss into the water reservoir than prior art designs employing a mesh or perforated divider wall at the bottom of the soil chamber. At the same time, the unique fabric-based filtration design provides a simple manufacture and assembly process that is compatible with a single-piece, double-walled roto-molded planter. In the illustrated embodiment, there is a singular drainage filtration assembly 16 centrally located on the divider wall 22 over a singular drainage opening 52 that is smaller than the mounting holes in which the wicking device tubes 32 are received, and the wicking devices are all situated radially outward of the singular drainage assembly at spaced locations around the soil chamber floor. However, the sizing, quantity and placement of one or more drainage filtration assemblies may be varied.

Likewise, the illustrated embodiment shows only two wicking devices, but it will be appreciated that the number of wicking devices and the particular placement thereof may vary, for example by employing a greater quantity of wicking devices for uniform dispersal of water throughout the soil chamber. Since double-walled roto-molded planters are already known in the art, additional details thereof, such as the fill-port by which water is added to the lower reservoir and optional ornamentation of the outer walls (e.g. incorporation of an integrally molded brick-like pattern) are omitted from the drawings in the interest of illustrative simplicity.

Figure 9:
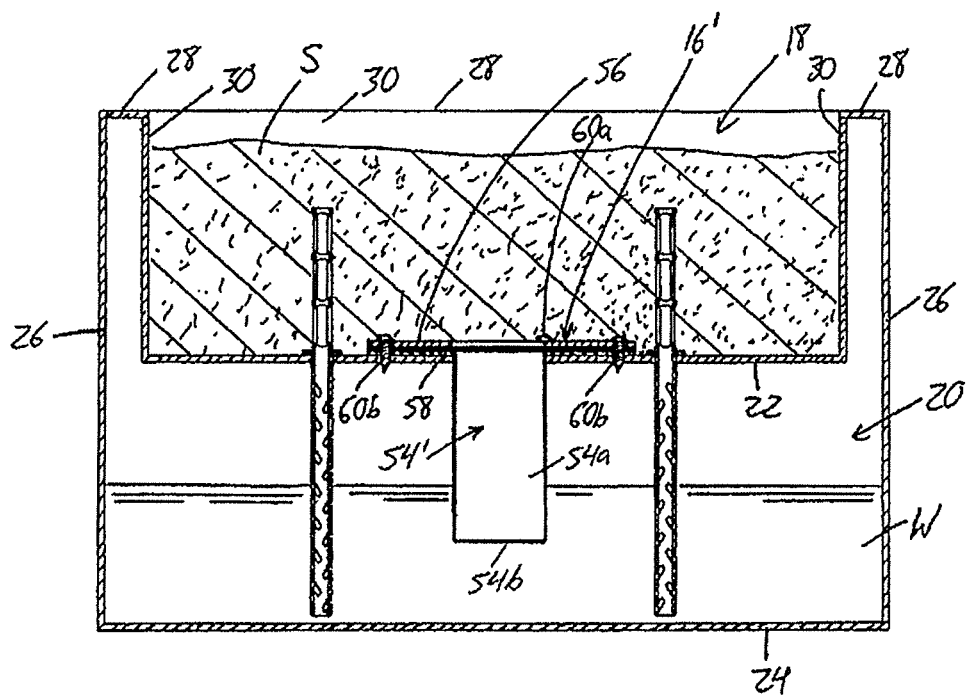
FIG. 9 is a cross-sectional view, taken from the same viewing plane as FIG. 3, of a self-watering planter apparatus using the alternate soil drainage filtration assembly of FIG. 8.
Figure 10A:
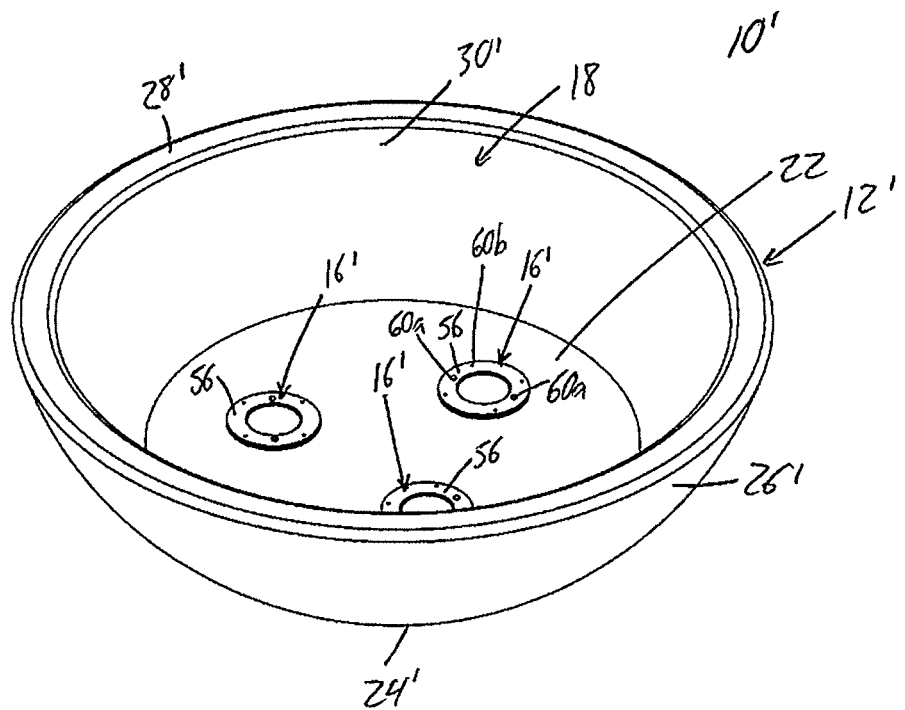
FIG. 10A is a perspective view of an alternate embodiment planter apparatus featuring a bowl-shaped planter employing multiple soil drainage filtration assemblies of the type shown in FIG. 8 for both wicking of stored reservoir water into the soil and drainage of excess rainwater from the soil.
Figure 10B:
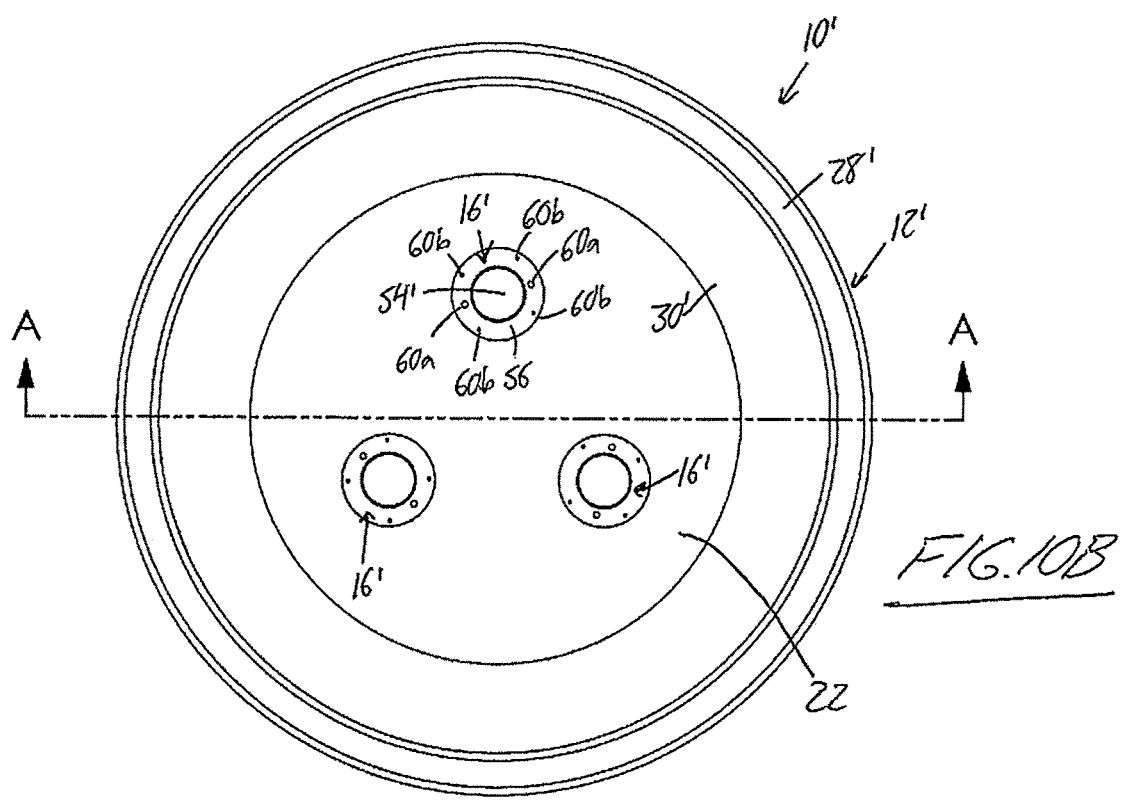
FIG. 10B is an overhead plan view of the planter apparatus of FIG. 10A.
Figure 10C:
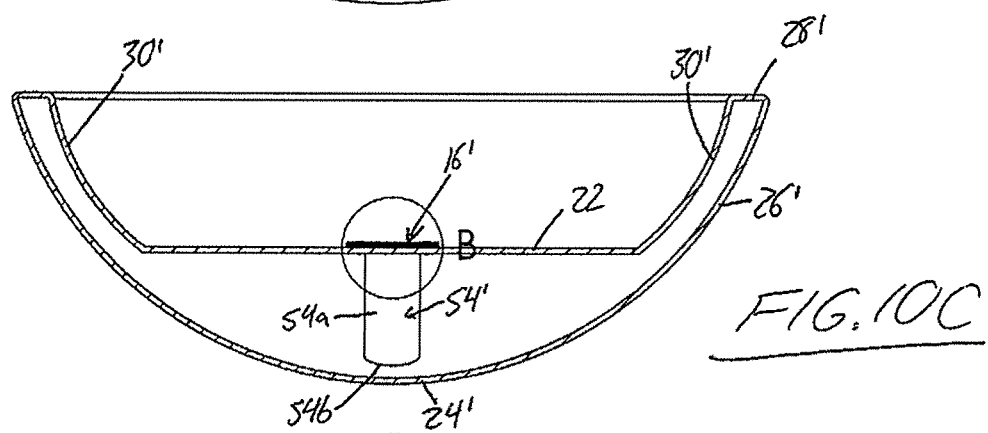
FIG. 10C is a cross-sectional view of the planter apparatus of FIG. 10B as would be seen along a vertical mid-plane denoted by line A-A thereof.
Figure 10D:
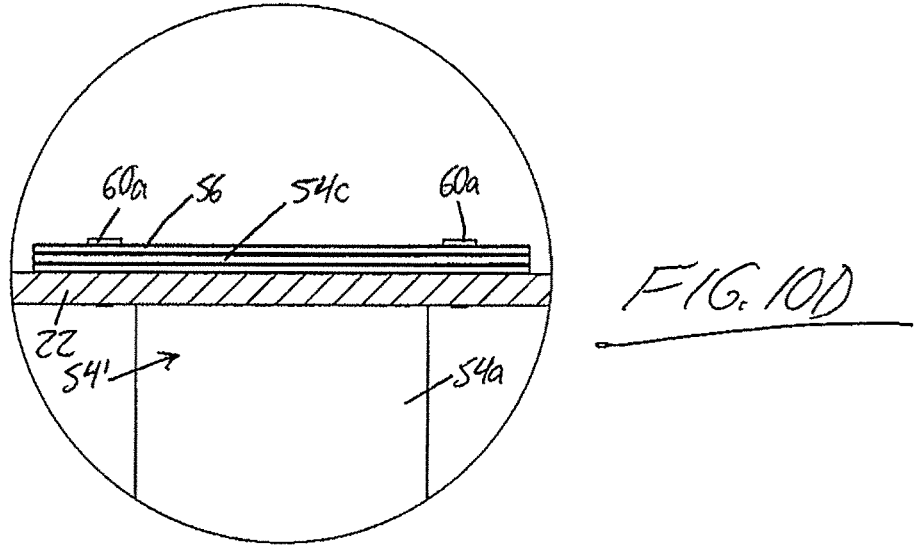
FIG. 10D is a closeup view of the planter apparatus FIG. 10C at the partial area thereof denoted by detail circle B.

FIGS. 8 through 10 illustrate an alternate embodiment of the filtration assembly 16', where instead of a flat soil filtration fabric sheet 54, a soil filtration fabric sack 54' instead features a hanging tubular portion 54a that terminates in a closed bottom end 54b, and a flange-like rim 54c that radiates outwardly from an open top end of the tubular portion 54a for sandwiching between the two annular mounting plates 56, 58. In this embodiment, instead of a relatively flat span of fabric held taught over the soil drainage opening 52 of the planter's divider wall 22, the tubular portion 54a of the fabric sack 54' hangs downwardly through the central hole of the lower mounting plate 58 and the underlying drainage opening 52 of the planter's divider wall 22 so as to suspend the closed bottom end 54b of the fabric sack 54 within the lower water reservoir 20 of the planter. Since the tubular part of the sack is open at the top end thereof to communicate the interior of the sack with the upper soil chamber, filling of the upper soil chamber 18 of the planter with soil S fills the hanging tubular portion of the fabric sack 54' with a volume of soil to be suspended within the lower water reservoir. This suspended volume of soil is therefore directly exposed to the stored water of the reservoir through the water-permeable soil filtration fabric.

When notable rainfall saturates the soil, the excess water can drain from the soil into the water reservoir in the same manner described above for the first embodiment of the filtration assembly. On the other hand, at other times when the soil is in need of moisture, the hanging fabric sack 54 and the soil contained therein cooperatively define another wicking device, where the fabric walls of the sack admit water from the reservoir into the suspended volume of soil inside the sack, and this volume of soil serves as a wicking agent by which the water is wicked up into the main volume of soil S in the upper soil chamber 18.

FIG. 10 illustrates a bowl-shaped embodiment of the planter apparatus 10' again having a double-walled rotomolded planter 12', but having curved and seamlessly integral bottom and outer walls 24', 26', curved inner walls 30' and a circular top edge wall 28' so that the resulting bowl-shaped structure is suitable for use as a hanging planter suspended from an overhead structure by chains or like. Due to the resulting concavity of the reservoir floor, the height of the water reservoir is more limited than in the rectangular planter of the first embodiment, and so the bowl-shaped planter cannot accommodate the significant height of the rigid outer tubes 32 of the first embodiment's wicking devices 14. Accordingly, the bowl-shaped embodiment doesn't employ the rigid-tube wicking devices 14 of the first embodiment, and instead relies solely on one or more of the sack-type soil drainage filtration assemblies 16' to both provide the self-watering wicking action of the planter and the saturated soil drainage function. The illustrated embodiment features three such sack-type devices 16' arranged in a triangular layout on the soil chamber floor, but the quantity and placement of one or more sack-type devices 16' may be varied.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A self-watering planter apparatus comprising:
    a planter having an upper soil chamber for holding a volume of soil to enable growth of one or more plants in said upper soil chamber, and a lower water reservoir disposed beneath said upper soil chamber to contain water for self-administered watering of said one or more plants;
    a divider wall that separates said upper soil chamber and said lower water reservoir, and a topside of which defines a floor of said soil chamber; and
    a plurality of water wicking devices reaching, or arranged for reaching, from the lower water reservoir into the upper soil chamber in an installed position of said to wick water from the lower water reservoir up into the upper soil chamber for self-administered watering of the one or more plants;
    a drainage opening in the divider wall through which excess water from the soil can drain into the lower water reservoir; and
    a filtration assembly at said drainage opening to allow said excess water to drain into the lower water reservoir while preventing soil from falling thereinto, said filtration assembly comprising a piece of soil filtration fabric, areas of which are held in a sandwiched state atop the floor of the soil chamber at an area thereof surrounding the opening in the divider wall by at least one mounting plate fitted atop said floor of the soil chamber.

2. The apparatus of claim 1 wherein said at least one mounting plate is fastened through said divider wall.

3. The apparatus of claim 1 wherein said at least one mounting plate comprises two mounting plates between which the soil filtration fabric is sandwiched.

4. The apparatus of claim 3 wherein said two mounting plates are attached together by a first set of fasteners, and attached to the divider wall by a second set of fasteners.

5. The apparatus claim 1 wherein said soil filtration fabric comprises a generally flat sheet of said fabric laid overtop of the drainage opening in the divider wall.

6. A self-watering planter apparatus comprising:
    a planter having an upper soil chamber for holding a volume of soil to enable growth of one or more plants in said upper soil chamber, and a lower water reservoir disposed beneath said upper soil chamber to contain water for self-administered watering of said one or more plants;
    a divider wall that separates said upper soil chamber and said lower water reservoir, defines a floor of said soil chamber; and
    an opening in the divider wall; and
    a sack made of soil filtration fabric allowing water to pass therethrough and preventing passage of soil therethrough, said sack having an open top end that communicates with the upper soil chamber, is held in place at an elevation closer to the divider wall than to a floor of the lower water reservoir, and from which a closed-bottom tubular portion of the sack hangs downwardly into the water reservoir toward the floor thereof.

7. The apparatus of claim 6 wherein the sack comprises a rim radiating outwardly from said open top end of the sack, said rim being sandwiched in place over the divider wall by at least one mounting plate fitted over the divider wall around the opening therein.

8. The apparatus of claim 6 wherein said sack contains a wicking agent therein enabling wicking of water into the upper soil chamber from the lower water reservoir.

9. The apparatus of claim 8 wherein the wicking agent is a volume of soil.

10. A method of filling a self-watering planter apparatus, said method comprising: providing the self-watering planter apparatus of claim 6, during deposit of a volume of loose soil into the upper soil chamber, depositing a fraction of said volume of loose soil into the closed-bottom tubular portion of the sack through the open top end of the sack, whereupon said fraction of said volume of loose soil is then held within the lower water reservoir in suspended fashion inside the closed-bottom tubular portion of the sack.

* * * * *